J. WILLNERS.
AUTOMATIC SCALE REGISTER.
APPLICATION FILED AUG. 2, 1915.
1,192,967.
Patented Aug. 1, 1916.
2 SHEETS—SHEET 1.
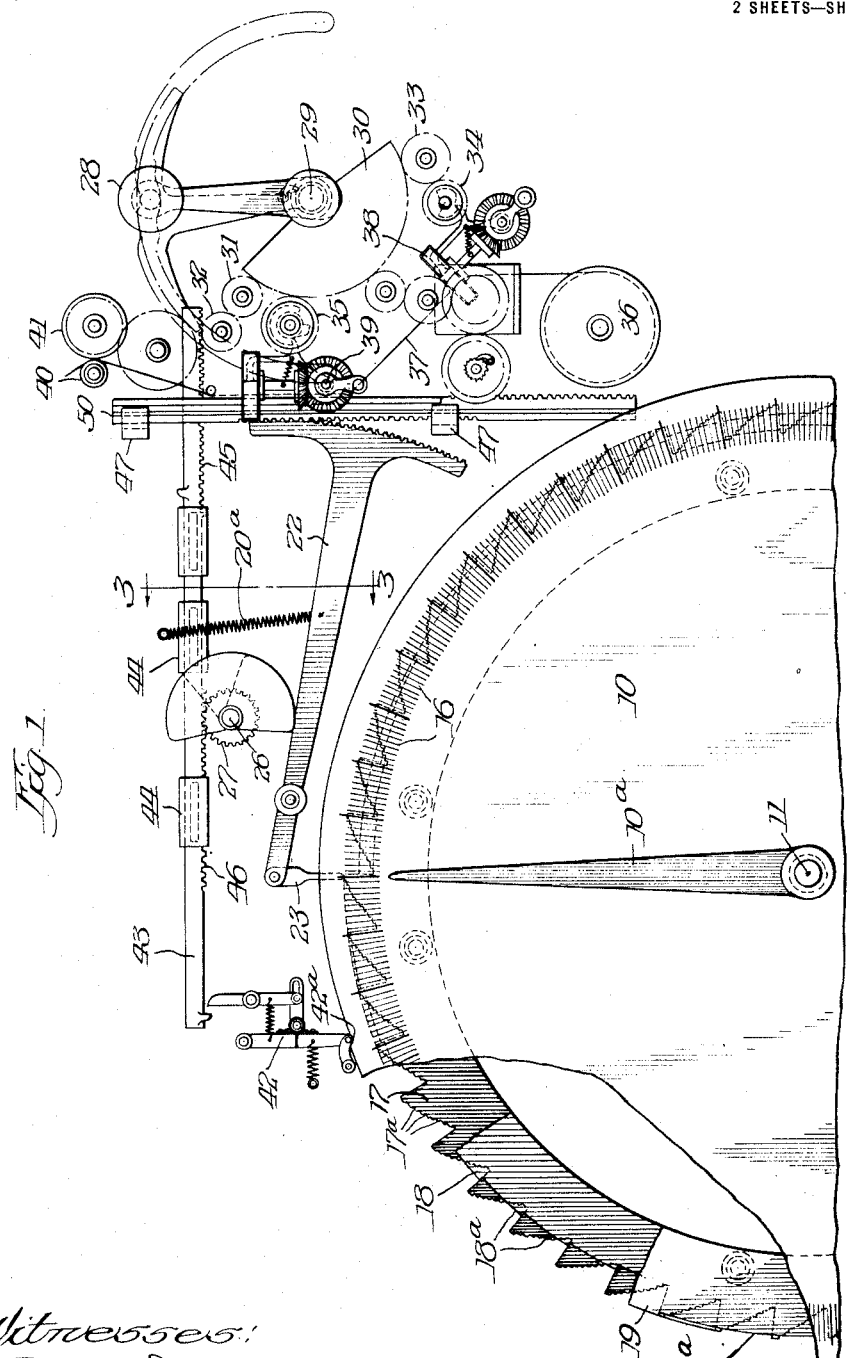

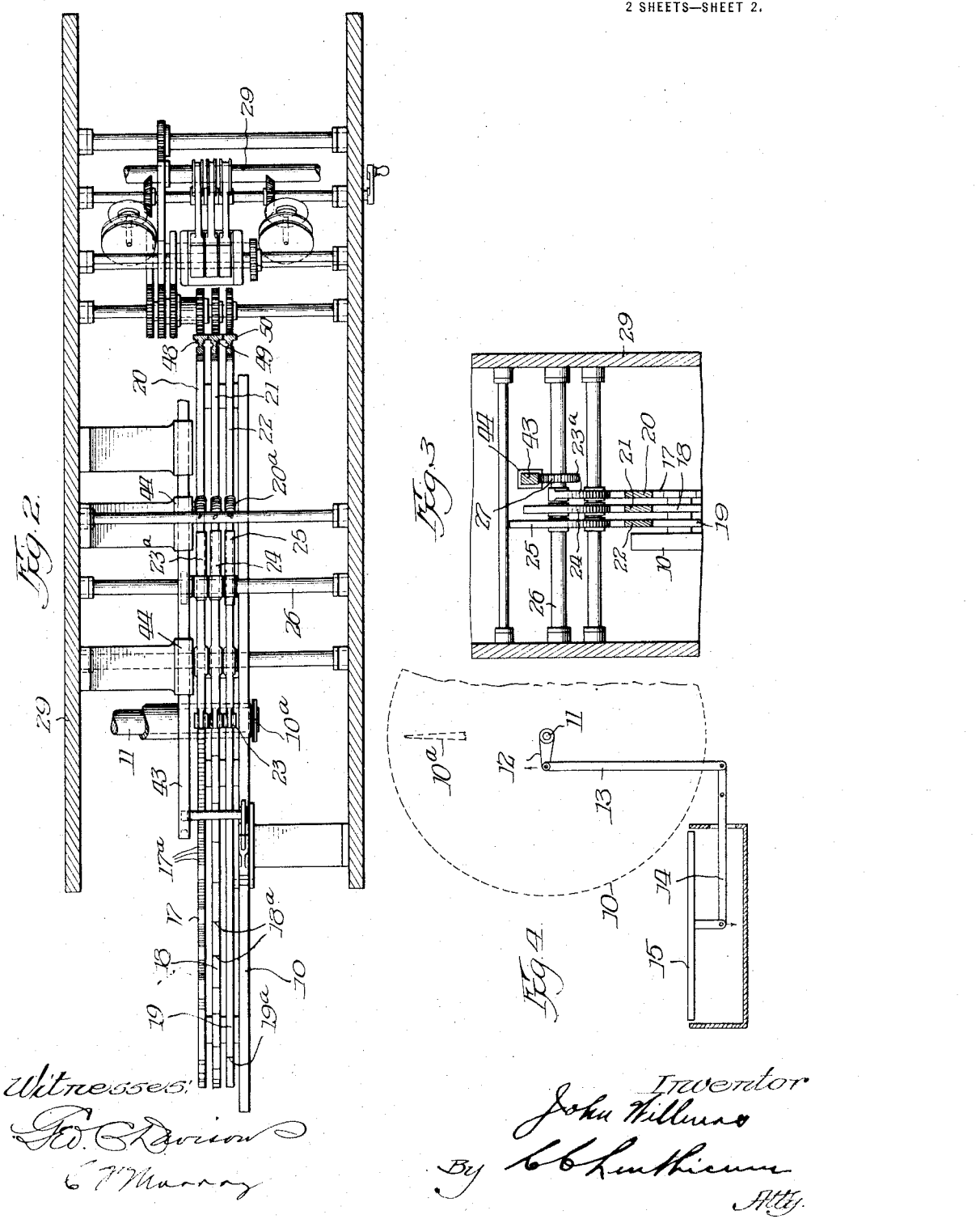

UNITED STATES PATENT OFFICE.

JOHN WILLNERS, OF CHICAGO HEIGHTS, ILLINOIS, ASSIGNOR OF ONE-HALF TO CHARLES FAHLSTROM, OF CHICAGO HEIGHTS, ILLINOIS.

AUTOMATIC SCALE-REGISTER.

1,192,967.　　　　　Specification of Letters Patent.　　Patented Aug. 1, 1916.

Application filed August 2, 1915. Serial No. 43,112.

*To all whom it may concern:*

Be it known that I, JOHN WILLNERS, a citizen of the United States, residing in Chicago Heights, county of Cook, and State of Illinois, have invented certain new and useful Improvements in Automatic Scale-Registers, of which the following is a specification.

My invention refers to that type of scales which are used for continual service in weighing materials for shipment, etc., and particularly the type which register and record the weights of the separate loads put on the scale platform, and finally records the total weight of all lots weighed.

My invention comprises a circular dial having graduations representing pounds and fractions thereof, instead of a scale beam, and a recording mechanism in operative conjunction therewith, which mechanism may be of any well known type.

One of the objects of my invention is to provide an accurate, yet simple, device for operating the recording mechanism.
Other objects will be apparent from the description and drawings.

In the preferred form of my invention I employ a revolving dial having toothed disks on the back thereof which engage pivoted levers, the levers being connected to the recording mechanism, one disk being cut to indicate units, one to indicate tens, one to indicate hundreds, etc. On the face of the dial are the usual numerals. A pointer is also provided to indicate the weight on the scale platform when the dial comes to rest. A dog or catch is also provided to hold the dial against movement while the load is being put on or removed from the scale platform.

One of the objects of my invention is to so connect the registering device with the revolving dial as to enable the operator to register the weights of the several loads put on the platform of a scale and at any time desired to take a total of the several weights so registered.

To enable those skilled in the art to fully understand my invention attention is directed to the drawings wherein like numbers indicate like parts in all of the figures.

Figure 1 is a side view showing the recording mechanism in diagram and one form of a partial view of the dial, and a full view of the means connecting the dial and the recording mechanism, the supporting means not being shown. Fig. 2 is a top view showing the relation between the toothed disks and the dial and between the disks and the recording mechanism, and the arms transmitting motion between the disks and the recorder. Fig. 3 is a sectional view on the line 3—3 of Fig. 1, showing the relative positions of the cams acting on the arms. Fig. 4 is a diagrammatic view of a scale showing platform and connections between it and the shaft revolving the dial.

In the drawings 10 is a dial arranged to be mounted on a scale and connected to the scale platform as indicated in Fig. 4. A shaft 11, to which is keyed or otherwise secured dial 10, is connected through arms 12, 13 and 14 to the scale platform 15 so that any movement of platform 15 will tend to revolve dial 10. On the face of dial 10 are provided the usual graduations 16 to represent pounds and fractions thereof. A fixed pointer 10ª is attached to a sleeve surrounding shaft 11 and fastened to the framework supporting shaft 11.

On the back side of dial 10 and rigidly secured thereto are toothed disks 17, 18, 19 graduated to represent units, tens and hundreds, respectively, which graduations correspond to the graduations 16 on the face of dial 10. Suitably pivoted to the upstanding portion of the scale are three arms 20, 21, 22, in the planes of disks 17, 18, 19, respectively, having pivoted depending end portions 23 which are adapted to engage the graduations on the disks 17, 18, 19. The other ends of arms 20, 21, 22 are provided with sector portions having teeth on the surfaces thereof, the purpose of which will be explained later. I further provide cams 23ª, 24, 25 arranged to bear against arms 20, 21, 23, respectively. These cams are keyed to a shaft 26; a gear wheel 27 is also keyed to shaft 26. Springs 20ª are fastened at one end to the frame and at the other to the arms 20, 21 and 22 and tend to hold them against cams 23ª, 24, and 25.

In the preferred form of recording mechanism, as shown in diagrammatic form in Fig. 1, 28 indicates a handle secured to a shaft 29 and adapted for circular movement about the shaft 29. Keyed to shaft 29 is a gear segment 30 having teeth on its periphery, the teeth not being shown in the diagram. Gear wheel 31 meshes with gear segment 30 and a gear wheel 32 meshes with gear wheel 31. On shaft 29, behind gear segment 30, is another gear segment (not shown) similar in shape and form to gear segment 30 which meshes with gear wheel 33 which in turn meshes with wheel 34. Also gear segment 30 meshes with gear wheel 35.

Numeral 36 represents a spool for carrying paper, the paper being represented by the line 37. The paper is threaded through totalizing device 38 and recording device 39—these being of usual form—and is carried upward through recording device 39 by rollers 40, 41.

It is to be understood that any approved type of recording mechanism may be used in connection with my circular dial but for reference and for the purpose of explanation I have shown the form as above described.

The disk 17 is provided with notches having teeth 17$^a$ to represent pounds 1, 2, 3, 4, 5, etc., a notch for each series of teeth representing ten pounds. The disk 18 is notched and provided with teeth 18$^a$ to represent ten pounds per tooth, one tooth being as large as one large notch of disk 17 having ten teeth thereon. The disk 19 has teeth 19$^a$ which measures hundreds, one tooth 19$^a$ being equal to ten of teeth 18$^a$, and a hundred of teeth 17$^a$. If a weight of 57 lbs. be placed on the platform 15 and the dial 10 allowed to revolve until it comes to rest, the end members 23 of arms 20, 21 and 22 will respectively engage the teeth of the disk as follows: Arm 22 resting on the hundreds disk will not change its position as the dial has not revolved far enough to pass the first tooth 19$^a$ on the hundreds disk, so no hundreds will be recorded. The tens disk 18 having revolved so that the fifth tooth 18$^a$ of the disk 18 is underneath end 23, will permit the inside end of arm 21 to move downwardly until the end 23 strikes the fifth tooth. This movement raises vertical rack 49 until the figure 5 on said rack is opposite the striking mechanism 39 of the recorder. In like manner the arm 20 will move until its end 23 strikes the seventh tooth of the units notch in alinement with the tens notch of disk 18. Thus will the vertical rack bar 48 be moved upwardly until the figure 7 thereon is opposite the striking mechanism 39. Reversal of handle 28 will cause the figure 57 on the racks 48 and 49 to be recorded on the paper strip 37.

For connecting the operation of the circular dial and its attached disk with the recording mechanism I further proceed as follows: For holding dial 10 against rotative movement during the time that the load is being put on or removed from scale platform 15 I employ a tripping mechanism 42 which bears against dial 10 at recess 42$^a$ to prevent rotative movement thereof while engaged with said recess. I provide a sliding rack bar 43 suitably mounted in bearings 44 attached to the members supporting the dial 10, which rack bar is provided with a rack 45 at its outer end and rack 46 near the middle portion. The rack 45 is adapted for engagement with gear wheel 32 in the recording mechanism. Rack 46 is for engagement with gear wheel 27 mounted on shaft 26, which shaft carries the cams 23$^a$, 24, 25. Suitably mounted in bearings 47 are vertical rack bars 48, 49, 50 which mesh with the teeth on the sector ends of the pivoted arms 20, 21, 22. These bars carry numerals on their faces opposite to the racks and are adapted for vertical movement through the registering mechanism 39 for the purpose of indicating on the paper strip 37 the weights registered by the toothed disks on the back of dial 10.

The operation of the mechanism is as follows: Handle 28, rack bar 43, tripping mechanism 42, cams 23$^a$, 24, 25, and the arms 20, 21, 22 being in the positions shown in Fig. 1, a load is put on the platform 15 of the scale, the tripping mechanism preventing the dial 10 from revolving. When it is desired to weigh the load on the platform of the scale the operator moves the handle 28 to the right. The movement of this handle immediately through gear segment 30, gears 31, and 32, moves rack bar 43 and trips the mechanism 42 allowing dial 10 to revolve. As the dial comes to rest, which it does almost immediately, the operator continues to move the handle to the right to the bottom of the slot shown by dotted lines, the continuation of which movement moves the rack bar 43 still farther, thus causing the gear wheel 27 on shaft 26 to revolve, thereby imparting rotation to cams 23$^a$, 24, 25. By the time the handle 28 has reached the end of the slot the rack 43 will have turned gear wheel 27 far enough so that none of the cams 23$^a$, 24, 25 are bearing against the arms 20, 21, 22. As soon as the restraint of the cams is removed the springs 20$^a$ pull the several arms upwardly. The upward movement of the outer ends of the arms is limited by the downward movement of the depending member 23 of the several arms and consequently this upward movement is limited by the teeth of the several disks which may be immediately under the end of the members 23. Thus the members 23 drop into the teeth on the several disks representing units, tens and hundreds, or the pounds thus indicating the weights of the load on the scale platform. Thus rotation of the arms moves the vertical racks 48, 49, 50 upwardly and as the angular movement of the sector ends of the arms is limited by the position of the members 23 at the other ends of the arms the racks will be moved different distances. Numerals on these racks will indicate the weight of the load on the scale platform because the depending members 23 at the other ends of the arms 20, 21, 22, rest in the notches on the disks fastened to the back of the dial 10.

In the operation of the recording mechanism there is a trip connected to roller 41 which at the proper time is actuated thus causing a hammer to strike the paper running through the rolls so that the numerals on the vertical racks are impressed on the roll of paper opposite the point where the hammer strikes. The time that the dial 10 with its attached disks rotates, and the time that the arms 20, 21 and 22 are permitted to engage the notches in such disks is very small. As explained, when the handle 28 is in vertical position, as shown in the full lines 21, the dial is held against rotation as the rack bar 45 is actuated by its handle. The moment the handle is moved to the right the rack bar is released and caused to move, thus actuating the trip 42 which releases the dial, the weight on the platform of the scales causing the dial to rotate. The movement of the rack bar 45 also releases the cams on the arms 20, 21 and 22 against engagement with the disks so that by the time the handle 28 is moved to the end of travel the dial is rotated to the proper position and the arms have engaged the proper notches and actuated the vertical rack bars 48, 49 and 50 to set up the proper weight opposite the hammer in the recording mechanism. After every load has been weighed, the handle 28 is returned to mid-position. This causes the rack bar 45 to be returned to its proper position, the dial bar to be held against rotation, and the arms to be held from engagement with the disks on the dial. When it is desired to impress a total of the several weights recorded the handle 28 is moved to the left, which movement causes the hammer actuated by gear 34 to strike the paper 37. The figures set up in this part of the recording mechanism indicate the total of the several series of figures which have been set up by the several operations of the racks 48, 49 and 50.

It will thus be seen that the device as disclosed in my invention provides a quick and accurate method of weighing materials during the process of loading or unloading the same and of furnishing a record of the several weights and a total of all.

The numerals on the face of the dial 10 indicate the weights as usual with any scale so that at any time the weight of the load on the scale platform may be observed without having to refer to the paper ribbon which is going through the recording mechanism.

I claim:

1. In a device of the class described, the combination of a recording mechanism, a rotatable shaft, a series of serrated disks secured to said shaft, one disk being serrated to indicate units, one to indicate tens, one to indicate hundreds and a corresponding series of suitably-mounted pivoted arms each having a finger secured to one end thereof and adapted to bear against one of said serrated disks, the other ends of said arms being adapted to engage said recording mechanism, substantially as described.

2. In a device of the class described, the combination of a recording mechanism, a rotatable shaft, a plurality of disks positively connected to said shaft and to each other and adapted for rotation in unison therewith, said disks having notches of different sizes on their peripheries, a corresponding series of pivoted arms having fingers secured to one end of each arm and adapted to bear against said disks, the other ends of said arms being adapted to engage said recording mechanism and to transfer thereto the amounts registered by said disks, substantially as described.

3. In a device of the class described, the combination of a rotatable shaft and a recording mechanism, a plurality of disks positively connected to said shaft and mounted for rotation in unison, said disks being provided with a plurality of notches, one disk having a number of notches ten times greater than the adjacent disk, the notches on each disk being divided into series of ten, the notches from one to ten being successively deeper than the preceding notch, a series of pivoted arms and fingers secured to one end of each arm and adapted to bear against said disks, the other end of said arms being adapted to engage said recording mechanism and to transfer thereto the amounts registered by said disks, and a manually-operable gear segment for controlling the movement of said arms, substantially as described.

4. In a device of the class described, the combination of a rotatable shaft and a recording mechanism, a plurality of disks directly connected to said shaft and mounted for rotation in unison, said disks being provided with a plurality of notches, one disk having a number of notches ten times greater than the adjacent disk, the notches on each disk being divided into series of ten, the notches from one to ten being successively deeper than the preceding notch, a series of pivoted arms having fingers secured to one end of each arm and adapted to bear against said disks after said disks have reached a position of rest, the other ends of said arms being adapted to engage said recording mechanism to set up the amounts corresponding to the depth of the disk indicated by the fingers on said arms, substantially as described.

5. In a device of the character described, the combination of a rotatable shaft, a recording mechanism, a plurality of serrated disks and a dial mounted on said shaft for unitary rotation, a plurality of pivoted arms having fingers adapted to coöperate with said disks and serving to actuate said recording mechanism, means for maintaining said fingers out of contact with said serrated disks, means for locking said dial and said disks against movement, and means for manually releasing said dial and disks and permitting said fingers to contact said serrated disks, substantially as described.

In testimony whereof I have hereunto signed my name in the presence of two subscribing witnesses.

JOHN WILLNERS.

Witnesses:
CHARLES H. BOWLER,
GUST. A. SAFSTUN.